United States Patent [19]
Kocay

[11] 3,741,260
[45] June 26, 1973

[54] POLYESTER MEAT SHROUD
[75] Inventor: Witold R. Kocay, Creve Coeur, Mo.
[73] Assignee: Monsanto Company, St. Louis, Mo.
[22] Filed: June 23, 1971
[21] Appl. No.: 156,061

[52] U.S. Cl................. 139/420 R, 57/140, 99/174
[51] Int. Cl............................................. D03d 15/00
[58] Field of Search.................. 139/383, 384, 387, 139/389, 420, 426; 57/140; 99/174

[56] References Cited
UNITED STATES PATENTS
| 3,275,455 | 9/1966 | Williams | 57/140 R |
| 3,104,450 | 9/1963 | Christens et al. | 57/140 R |
| 3,458,986 | 8/1969 | Allison et al. | 57/140 R |
| 3,481,371 | 12/1969 | Row | 139/383 R |
| 3,544,404 | 12/1970 | Johnson et al. | 139/389 |

Primary Examiner—Henry S. Jaudon
Attorney—Elmer J. Fischer, Thomas Y. Awalt, Jr. et al.

[57] ABSTRACT

Nonswelling nonwicking meat shrouds of high tenacity polyethylene terephthalate staple fibers with inherently low moisture regain provide superior conductivity while conditioning meat carcasses in the chilling stages without excessive dehydration.

5 Claims, No Drawings

POLYESTER MEAT SHROUD

This invention relates to the conditioning of animal carcasses after slaughtering and skinning during which the carcasses are shrouded and placed in a cool atmosphere. At this time the surface fat is smoothed and bleached, and the carcass temperature is lowered to about the freezing temperature. Meat shrouds have been produced from cotton, ramie and rayon. Generally speaking, moisture regain, wicking, water swelling, water retention, and high wet-modulus were considered essential characteristics to be sought in meat shrouds in order to prevent the dehydration of the meat in order to absorb blood so that the surface of the meat is as blood-free as possible.

In addition to the aforementioned characteristics sought, it was also considered essential that meat shrouds have high strength and resistance to tear and a soil and stain release as well as stability to withstand chlorine bleaching without serious fiber damage for the reason that mean shrouds are laundered after each use and must be reasonably clean for reuse.

It is an object of this invention to provide a meat shroud which will function to prevent excessive dehydration of the meat carcass, all the while providing sufficient absorption of blood along with high breaking strength.

It is yet another object of this invention to provide a method for the preparation of meat shrouds from polyester fibers which are the functional equivalents of other meat shrouds, but having the low moisture regain and absorption characteristic with consequent ease of soil and stain release in conjunction with high breaking strength normally expected in polyester fibers and fabrics. These and other objects of the invention will become apparent from a consideration of the following specification and claims.

In accordance with this invention, meat shrouds are produced, a substantial portion of which comprises a manufactured fiber in which the fiber-forming substance is a long-chain synthetic polymer composed of at least 85 percent by weight of an ester of a dihydric alcohol and terephthalic acid, the fibers being characterized by a denier of from about 4 to 8; a tenacity of at least about 5 grams per denier, a very low moisture regain; spun yarn being characterized by a staple length of at least about 3 inches, an elongation of about 15 percent, and a shrinkage of about 5.5 percent; the fabric being characterized by a percentage of absorbency of about 85–140, a skewer strength of at least about 80 pounds, a grab strength of at least about 140 pounds in both warp and fill direction, a residual boiling water shrinkage of about 2 percent, and high abrasion resistance.

I have discovered that polyester meat shroud cloths made in accordance with these specifications can be as effective as presently used 100 percent ramie, cotton, or other cellulosic cloth, in preventing the dehydration of whole beef carcasses.

The terms used above are employed in the usual meaning in the textile art except as follows: "Skewer strength" is a laboratory test designed to measure the pounds of force required to rupture the fabric when strained by a skewer of similar design to that actually used in a packing plant during the shrouding operation. After wetting, a specimen from the fabric is punctured by the skewer near one end and the opposite end is clamped in the stressing jaw of a tensile tester at a constant rate of extension. The cross-wise yarns are pulled against the skewer until a number have ruptured. The force is recorded automatically on a chart calibrated in units of pounds. The average of the individual yarn breaks for each principle direction is reported for the sample. The value obtained is a function of the individual yarn strength plus the support of the adjacent yarns. Calculation of the average force is based on ASTM Standard D-2261 "Tearing Strength of Fabrics by Tongue Method (Constant Rate-of-Extension Tensile Testing Machine)." The average of the five highest peaks recorded on the chart is reported. Specimens having filling yarns parallel to the long dimension are used for testing the warp yarns, and specimens with the warp yarns parallel to the long dimension are used for the test of the filling yarns. All specimens are soaked in distilled water for 2 hours, removed and blotted lightly to remove surface water. The skewer position is determined by means of a 3 inch square template drilled with a ⅛ inch hole in the center. Using the template, the skewer is positioned 1½ inches from the end of the sample. Before inserting the skewer, a pencil or similar instrument is used to spread the yarns in the form of a hole. The skewer projection is fastened to the upper grip of the tensile tester and the other end of the sample is clamped in the lower grip. The tensile tester is operated with cross-head speed (rate of extension) of 5 inches/minute, a chart speed (recorder) of 10 inches/minute, a load scale of 200 pounds, a jaw separation (between clamps) of 6 inches, and with jaw faces (smooth) at 1 by 3 inches.

"Abrasion Resistance" has been measured according to tests conducted with a Wyzenbeek Abrader, a machine performing a unidirectional abrasion using a fixed tension, fixed head load, and preselected abrasive. The tension and head load were set at 2 pounds and the abrasive was No. 600A Soft Back supplied by Minnesota Mining and Manufacturing Company. The samples were abraded to 100, 200, 300 and 400 rubs after which each sample was weighed and then raveled to a 1 inch strip and broken. The weighed samples were compared against the original weight to determined fiber loss and the strength was compared against that of the original sample to determined strength loss. Tests were conducted on selvage and regular fabric specimens.

A so-called "flat" abrasion test was also conducted on the Stoll Universal Wear Tester. This is a unidirectional abrasion of fabric to abrasive, the same abrasive being used as in the Wyzenbeek test, a head load of 1 pound was selected in a conjunction with abrasions of 1,000, 2,000, 3,000, and 4,000 cycles. As in the Wyzenbeek test, samples were weighed and broken before and after each abrasion.

"Moisture absorbency" as referred to herein is according to a test run on meat shroud samples cut into squares to 22 centimeters. The sample is weighed after conditioning at standard conditions; then soaked in distilled water for 15 minutes. One corner of the sample is then removed from the water using tweezers, and allowed to drip for 30 seconds after which the sample is weighed. It is then hung under standard conditions from two corners for 3 hours, and weighed again.

The grab strength test or grab test is a standard method of test for textile fabrics and is known as ASTM D-1682-64 (Reapproved 1970) of the American National Standards Institute.

The polyester fibers contemplated in the practice of the invention are those formed from dicarboxylic acids and polymethylene glycols, and copolyesters or modifications of these polyesters and copolyesters. Preferred are fibers composed of at least 85 percent by weight of an ester of a dihydric alcohol and terephthalic acid. It is well known that these synthetic linear condensation polyesters can be formed into filaments and the like and subsequently oriented permanently by drawing. Among the polyesters and copolyesters specifically useful in the instant invention are those resulting from heating one or more of the glycols of the series $HO(CH_2)_nOH$, in which $n$ is an integer of from 2 to 10, with one or more dicarboxylic acids or ester-forming derivatives thereof. Among the dicarboxylic acids and ester-forming derivatives thereof useful in the present invention there may be named terephthalic acid, isophthalic acid, p,p'-dicarboxy-biphenyl, p,p'-dicarboxy-diphenyl sufone, p,p'-dicarboxy-diphenyl methane, and the aliphatic, cycloaliphatic, and aryl esters and half esters, ammonium and amine salts, and the acide halides of the above compounds, and the like. Examples of polyhydric alcohols which may be employed in the manufacture of these fibers are ethylene glycol, trimethylene glycol, cyclohexane dimethanol, and the like. Polyethylene terephthalate is the preferred polymer because of the ready availability of terephthalic acid or dimethyl terephthalate and ethylene glycol, from which it is made. It also has a relatively high melting point of 250°-265°C., and the fibers are, in themselves more readily wettable as compared, for example, with nylon or polypropylene.

I have discovered that meat shrouds prepared from these polyester fibers can be as effective as 100 percent ramie cloth in the prevention of dehydration of whole beef carcasses, with other properties being superior to ramie shroud cloths or other cellulosic fiber shroud cloths.

EXAMPLES

Polyethylene terephthalate fibers of 5.2 denier, a tenacity of 8 grams per denier, and having an elongation of 20 percent were cut into 6 inch staple. Yarn prepared from this staple fiber as both singles and plied had the following specifications:

TABLE I

Yarn Physicals

| | Singles | Plied |
|---|---|---|
| Yarn Number, w.c. | 1/21.1 | 2/20.4 |
| Breaking Strength, lbs. | 4.15 | 9.26 |
| SEP | 1400 | 1511 |
| Elongation, % | 14.7 | 16.5 |
| Shrinkage, % | 5.0 | 5.7 |
| Skein Break, 120 yds., lbs. | 414 | — |
| Break Factor | 8750 | — |

Fabric prepared from the 2 ply yarn was according to the following specification:

TABLE II

| Warp: | Width | 46 inches |
|---|---|---|
| | Ends | 1128 Incl. selvage |
| | Draw | Straight 4 Harness |
| | Weave | Plain |
| | Loom | X-3 Cam |
| | Reed | 12/2/1 ground 12/3/1 selvage |
| | Pick Gear | 25 |

Fabric constructed from the doubled yarn had a grab strength averaging about 275 pounds in both warp and fill direction and a skewer strength of 127.0–140.0 pounds. Residual boiling water shrinkage was about 2 percent.

A fabric constructed from the singles yarn and with 21 ends and 26 picks, fabric weight of about 6.0 ounces per square yard in a final width of about 39.5 inches, had a skewer strength of 104–143 pounds and a residual fabric shrinkage at the boil of about 1 percent. Shroud cloths of polyester and ramie were compared to determine their relative ability to prevent dehydration of whole beef carcasses. Polyurethane sponges and carborundum stones were saturated with 100° F. water (corresponding to the body temperature of beef cattle) and then wrapped in commercially available ramie and polyester shroud cloths (prepared as above with the 2 ply yarn) that had been previously wetted-out in an 80° F. brine solution. The dry weights and amount of water absorbed by sponges and stones are shown in Table III. The shrouded sponges and carborundum stones were suspended from a rod and placed in a refrigerator at a controlled temperature of 41°–43° F. After 24, 48, and 72 hours in the refrigerator they were each removed and individually weighed. The results are shown at Table IV. During the testing it was noticed that the external surfaces of the ramie fabric remained moist whereas the polyester shroud surface felt dry. This difference was probably due to the fact that the ramie natural fiber had a higher moisture regain than synthetic polyester fiber.

TABLE III

Dry Weights of and the Amount of Water Absorbed by the Shrouded Sponges and Carborundum Stones

| | 100% Ramie | | 100% Polyester | |
|---|---|---|---|---|
| | Sponge | Stone | Sponge | Stone |
| Dry Weight of the Indicated Absorbent [Excluding the Shroud Fabric], g. | 51.8 | 496.1 | 49.1 | 496.1 |
| Weight of Water Absorbed by the Indicated Absorbent and Shroud Cloth*, g. | 236.2 | 95.4 | 235.5 | 90.1 |

* Weight used as the denominator in the calculations of Table IV percent moisture loss values.

TABLE IV

Percent Moisture Loss by Saturated Sponges and Carborundum Stones Wrapped in Ramie and Polyester Shroud Fabric after 24, 48, and 72 hours in a 41°–43° F. Refrigerator

| | 100% Ramie | | 100% Polyester | |
|---|---|---|---|---|
| | Sponge | Stone | Sponge | Stone |
| After 24 Hours | 18.8% | 23.6% | 15.8% | 19.5% |
| After 48 Hours | 29.1% | 44.7% | 26.7% | 37.6% |
| After 72 Hours | 36.9% | 63.1% | 35.2% | 51.9% |

Since the sponges and stones wrapped in ramie had a higher percent moisture loss than those wrapped in polyester, it might appear that the polyester shroud cloths would better prevent dehydration than the ramie cloths, but that the polyester shroud cloths would be relatively ineffective in removing blood from the carcass. Field trails have shown that although the polyester fiber itself can and does absorb a substantial amount of the blood, the fabric construction and the staple yarn itself provides additional interfilament absorption of the blood, the combined effect being more than satisfactory for commercial use.

Wyzenbeek and Stoll abrasion tests were run on samples of commercially available ramie shrouds and on polyester shrouds, the latter having been constructed as indicated above with the two ply yarn. These test were conducted on selvage and regular fabric specimens.

The results of both Wyzenbeek and Stoll Abrasion testing is shown at Table V.

TABLE V

| | Wyzenbeek Abrasion | | | | | |
|---|---|---|---|---|---|---|
| | Ramie | | Polyester | | Polyester | |
| | Sel-vage | Body | Sel-vage | Body | Sel-vage | Body |
| Breaking Strength, lbs. (1″ Width, Warp) | | | | | | |
| Original | 248 | 147 | 306 | 224 | 301 | 223 |
| After 100 Cycles | 256 | 153 | 283 | 206 | 313 | 216 |
| After 200 Cycles | 222 | 68 | 264 | 158 | 291 | 164 |
| After 300 Cycles | — | 49 | 256 | 124 | 306 | 172 |
| After 400 Cycles | — | 26 | 250 | 130 | 266 | 104 |
| Weight Loss, mgs | | | | | | |
| After 100 Cycles | 29.6 | 53.1 | 21.2 | 20.3 | 35.6 | 22.0 |
| After 200 Cycles | 66.2 | 103.1 | 32.5 | 24.6 | 33.1 | 43.0 |
| After 300 Cycles | — | 160.1 | 46.2 | 35.7 | 40.6 | 56.9 |
| After 400 Cycles | — | 177.3 | 56.7 | 34.1 | 50.4 | 79.8 |
| | Stoll "Flat" Abrasion | | | | | |
| Break Strength, lbs. (1″ Width, Warp) | | | | | | |
| Original | 248 | 147 | 306 | 224 | 301 | 223 |
| After 1000 Cycles | — | 126 | 310 | 176 | 307 | 176 |
| After 2000 Cycles | 282 | 101 | 259 | 184 | 312 | 156 |
| After 3000 Cycles | — | 84 | 285 | 161 | 310 | 165 |
| After 4000 Cycles | 170 | 85 | 218 | 136 | 302 | 170 |
| Weight Loss, mgs | | | | | | |
| After 1000 Cycles | — | 19.4 | 6.0 | 3.4 | 5.0 | 7.3 |
| After 2000 Cycles | 8.7 | 30.5 | 3.9 | 0.1 | 13.0 | 6.4 |
| After 3000 Cycles | — | 47.1 | 1.4 | 4.9 | 12.8 | 3.0 |
| After 4000 Cycles | 20.6 | 53.0 | 9.6 | 6.9 | 12.1 | 18.0 |
| | Wyzenbeek Abrasion | | | | | |
| Strength Retained, % (Warp) | | | | | | |
| After 100 Cycles | 100 | 100 | 92.5 | 92 | 100 | 97 |
| After 200 Cycles | 89.5 | 46 | 86.5 | 70.5 | 97 | 74.5 |
| After 300 Cycles | — | 27 | 83.5 | 55.5 | 100 | 77 |
| After 400 Cycles | — | 17.5 | 81.5 | 58 | 88.5 | 46.5 |
| | Stoll "Flat" Abrasion | | | | | |
| Strength Retained, % (Warp) | | | | | | |
| After 1000 Cycles | — | 86 | 100 | 78.5 | 100 | 79 |
| After 2000 Cycles | 100 | 68.5 | 85 | 82 | 100 | 70 |
| After 3000 Cycles | — | 57 | 93 | 72 | 100 | 74 |
| After 4000 Cycles | 68.5 | 57.5 | 71 | 61 | 100 | 76 |

We claim:

1. Meat shrouds comprising fabric, a substantial portion of which comprises spun yarn, a substantial portion of which comprises a manufactured fiber in which the fiber-forming substance is a long-chain synthetic polymer composed of at least 85 percent by weight of an ester of a dihydric alcohol and terephthalic acid, said fibers being characterized by:
   a. a denier of from about 4 to 8;
   b. a tenacity of at least about 5 gpd;
   c. a moisture regain of about 0.4;
said spun yarn characterized by:
   a. a staple length of at least about 3 inches;
   b. an elongation of about 15 percent;
   c. a shrinkage of about 5.5 percent;
said fabric being characterized by:
   a. a percentage of absorbency of about 85-140;
   b. a skewer strength of at least about 70 pounds;
   c. a grab strength of at least about 100 pounds in both warp and fill direction;
   d. a residual boiling water shrinkage of about 2 percent;
   e. a Wyzenbeek abrasion strength retention (warp) after 300 cycles of at least about 50 percent.

2. The meat shroud of claim 1 wherein the skewer strength is at least about 85 pounds.

3. The meat shroud of claim 1 wherein the grab strength is at least about 150 pounds in both warp and fill direction.

4. The meat shroud of claim 1 wherein the staple length is about 4 inches.

5. Meat shrouds comprising fabric, a substantial portion of which comprises spun yarn, a substantial portion of which comprises a manufactured fiber in which the fiber-forming substance is a long-chain synthetic polymer composed of at least 85 percent by weight of an ester of a dihydric alcohol and terephthalic acid, said fibers being characterized by:
   a. a denier of from about 5 to 8;
   b. a tenacity of at least about 6 gpd;
   c. a moisture regain of about 0.4;
said spun yarn characterized by:
   a. a staple length of at least about 4 inches;
   b. an elongation of about 15 percent;
   c. a shrinkage of about 5.5 percent;
said fabric being characterized by:
   a. a percentage of absorbency of about 97-140;
   b. a skewer strength of at least about 85 pounds;
   c. a grab strength of at least about 150 pounds in both warp and fill direction;
   d. a residual boiling water shrinkage of about 2 percent;
   e. a Wyzenbeek abrasion strength retention (warp) after 300 cycles of at least about 50 percent.

* * * * *